United States Patent
Mutoh

(10) Patent No.: US 8,300,343 B2
(45) Date of Patent: *Oct. 30, 2012

(54) MAGNETIC BIT-PATTERNED DISK AND DISK DRIVE

(75) Inventor: Hiroshi Mutoh, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 84 days.

This patent is subject to a terminal disclaimer.

(21) Appl. No.: 12/726,270

(22) Filed: Mar. 17, 2010

(65) Prior Publication Data

US 2010/0238576 A1    Sep. 23, 2010

(30) Foreign Application Priority Data

Mar. 17, 2009   (JP) .................................. 2009-064444

(51) Int. Cl.
*G11B 5/09*  (2006.01)
(52) U.S. Cl. .......................................... 360/51; 360/48
(58) Field of Classification Search ........................ None
See application file for complete search history.

(56) References Cited

U.S. PATENT DOCUMENTS

2010/0118428 A1*   5/2010   Buch et al. ....................... 360/51
2010/0118429 A1*   5/2010   Vikramaditya et al. ......... 360/51

FOREIGN PATENT DOCUMENTS

| JP | 2000-048352 | 2/2000 |
| JP | 2004-199806 | 7/2004 |
| JP | 2006-164349 | 6/2006 |

* cited by examiner

*Primary Examiner* — Regina N Holder
(74) *Attorney, Agent, or Firm* — Knobbe, Martens, Olson & Bear, LLP

(57) ABSTRACT

According to one embodiment, a disk drive having a magnetic disk of the bit pattern media type is provided. The disk drive has a reproduction module configured to reproduce a signal from a measurement area provided on the magnetic disk and holding groups of phase-shift measuring bits, a measurement module configured to measure a phase shift that a write clock signal has with respect to data recording bits held in a data record area provided on the magnetic disk, when the signal reproduced by the reproduction module is indefinite, and a recording module configured to record data that corresponds to the data recording bits, by using the write clock signal adjusted by the phase shift.

10 Claims, 5 Drawing Sheets

| n | Phase shift (degrees) |
|---|---|
| 0 | 180 |
| 1 | 240 |
| 2 | 300 |
| 3 | 0 |
| 4 | 60 |
| 5 | 120 |
FIG. 2
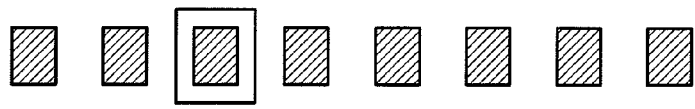
FIG. 4A
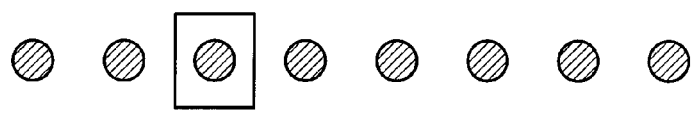
FIG. 4B
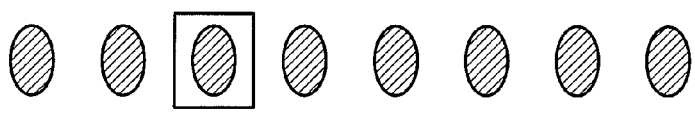
FIG. 4C
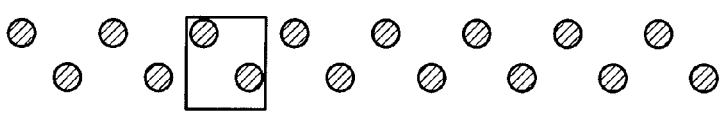
FIG. 4D
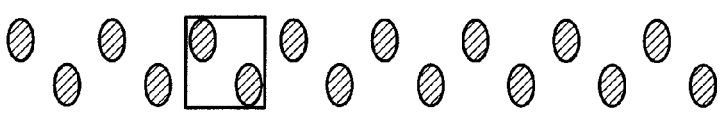
FIG. 4E

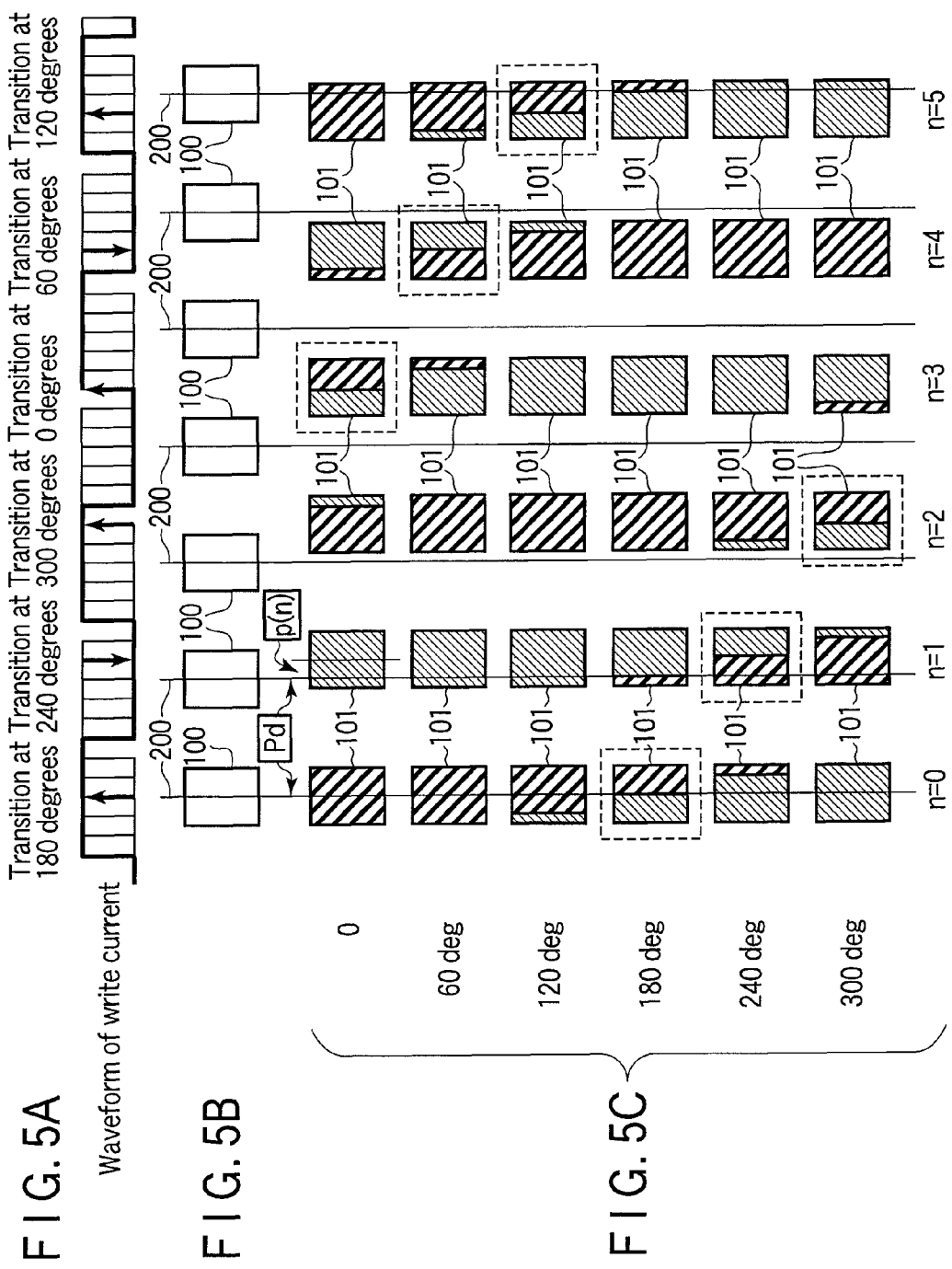

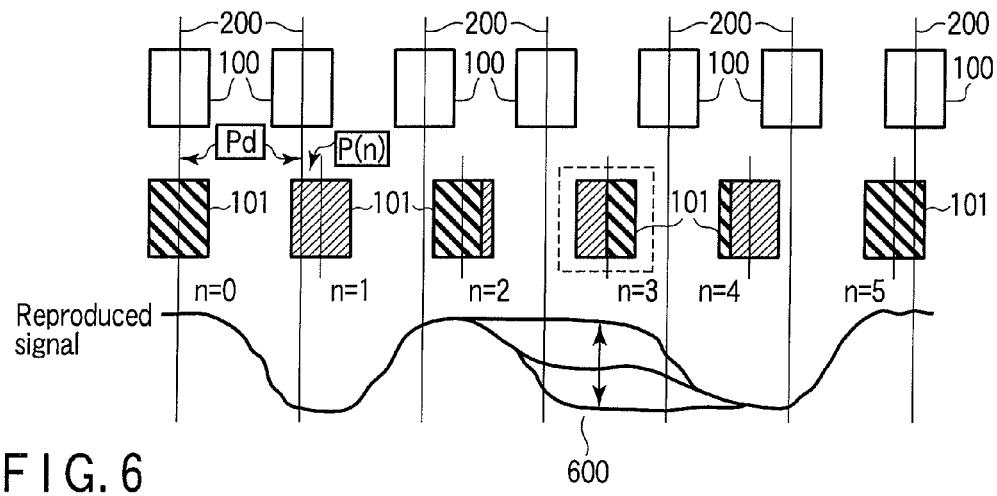
F I G. 6
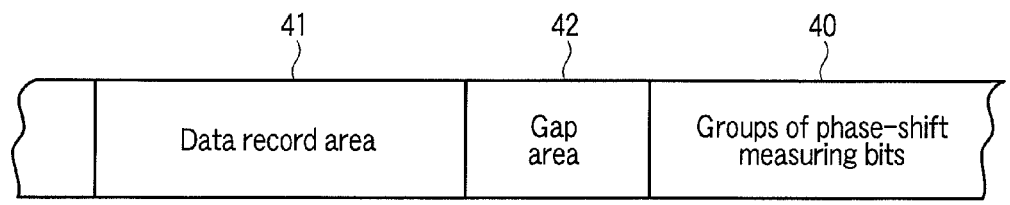
F I G. 7
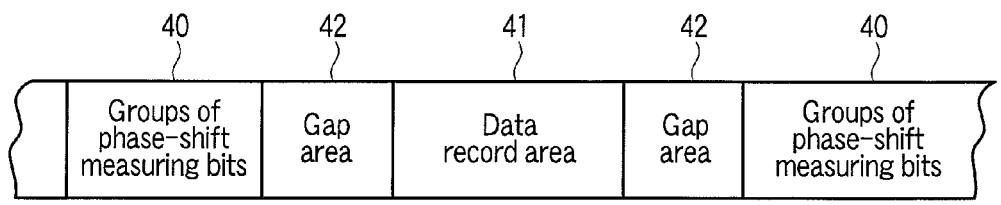
F I G. 8

MAGNETIC BIT-PATTERNED DISK AND DISK DRIVE

CROSS-REFERENCE TO RELATED APPLICATIONS

This application is based upon and claims the benefit of priority from Japanese Patent Application No. 2009-064444, filed Mar. 17, 2009, the entire contents of which are incorporated herein by reference.

BACKGROUND

1. Field

One embodiment of the present invention relates to a disk drive using a bit-patterned medium and a magnetic disk of the bit-patterned medium.

2. Description of the Related Art

In recent years, various techniques have been developed to achieve high-density data recording, as demand increases for large storage capacity in the field of disk drives, a representative example of which is the hard disk drive. Attention is now being paid to a bit-patterned media (BPM) system, which is a technique for achieving high-density data recording. The BPM system is a recording system that records data bits in association with magnetic dots or magnetic dot groups which are formed on a magnetic disk (i.e., recording medium) and which are magnetically independent of one another.

In the BPM system, the magnetic dots or magnetic dot groups (hereinafter, generally called "magnetic dots") formed on the magnetic disk must be synchronous with the transition timing of the write current. (This synchronization will be referred to as "recording synchronization".) If the recording synchronization is incomplete, the write current will undergo transition at, for example, the center of each magnetic dot provided on the magnetic disk. Consequently, the magnetization direction of each magnetic dot will become indefinite, resulting in a write error.

To prevent such write errors, it is necessary to generate a write clock signal of high precision that is synchronous with the magnetic dots formed on the disk. Methods of generating such a write clock signal have been proposed. In one of these methods, a preamble (region), in which a continuous pattern is recorded, is arranged at the head of each sector and detected in preparation of recording data, and a write clock signal is generated from the continuous pattern reproduced from the preamble.

Since the detection of the preamble is synchronous with the reproduced signal in the above-mentioned prior art, the timing of recording data in synchronism with the magnetic dots is indeed synchronous in terms of frequency with the magnetic dots. However, the write clock signal and the magnetic dots are not always synchronous in terms of phase. Consequently, precise recording synchronization cannot be accomplished. In the disk drive, the data reproduction circuit (read channel) and the data recording circuit (write channel) delay data signals differently, because they are circuits that operate independently. Further, since the write head and the read head are physically spaced apart from each other and are different in configuration, they differ in terms of delay time. Therefore, the write clock signal is hardly be correctly synchronized with the magnetic dots even if the detection of the preamble is synchronous with the reproduced signal.

In order to solve this problem, a data recording apparatus has been proposed, in which the write clock signal is delayed so that the error rate may become optimal, thereby to accomplish recording synchronization (see the above-identified document). In this data recording apparatus, however, the read channel must be optimized in order to determine the error rate. Moreover, the bits on the magnetic disk must be synchronized with the timing of recording data on the disk in order to optimize the read channel. In the data recording apparatus described above, an equalizer that performs waveform equalization on a read signal for a partial response is used to determine the error rate. However, the equalizer may not always be optimized in the apparatus. Therefore, it cannot be determined whether the error rate determined is optimal or not. As a result, the bits on the magnetic disk cannot be synchronized with the timing of recording data on the magnetic disk.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is a diagram showing an exemplary phase-shift table according to the embodiment;

FIGS. 4A, 4B, 4C, 4D and 4E are diagrams illustrating various examples of phase-shift measuring bits that may be used in the embodiment;

FIGS. 5A, 5B and 5C are diagrams explaining a process of finding phase-shift measuring bits in the embodiment;

FIG. 6 is a diagram also explaining the process of finding phase-shift measuring bits in the embodiment;

FIG. 7 is a diagram showing an exemplary track format according to another embodiment of this invention; and FIG. 8 is a diagram showing an exemplary track format according to still another embodiment of this invention.

DETAILED DESCRIPTION

Various embodiments according to the invention will be described hereinafter with reference to the accompanying drawings. In general, according to one embodiment of the invention, there is provided a disk drive that has the function of measuring the phase shift of a write clock signal, in order to generate a write clock signal synchronous with the bits formed on a magnetic disk.

[Configuration of the Disk Drive]

Figure 1:
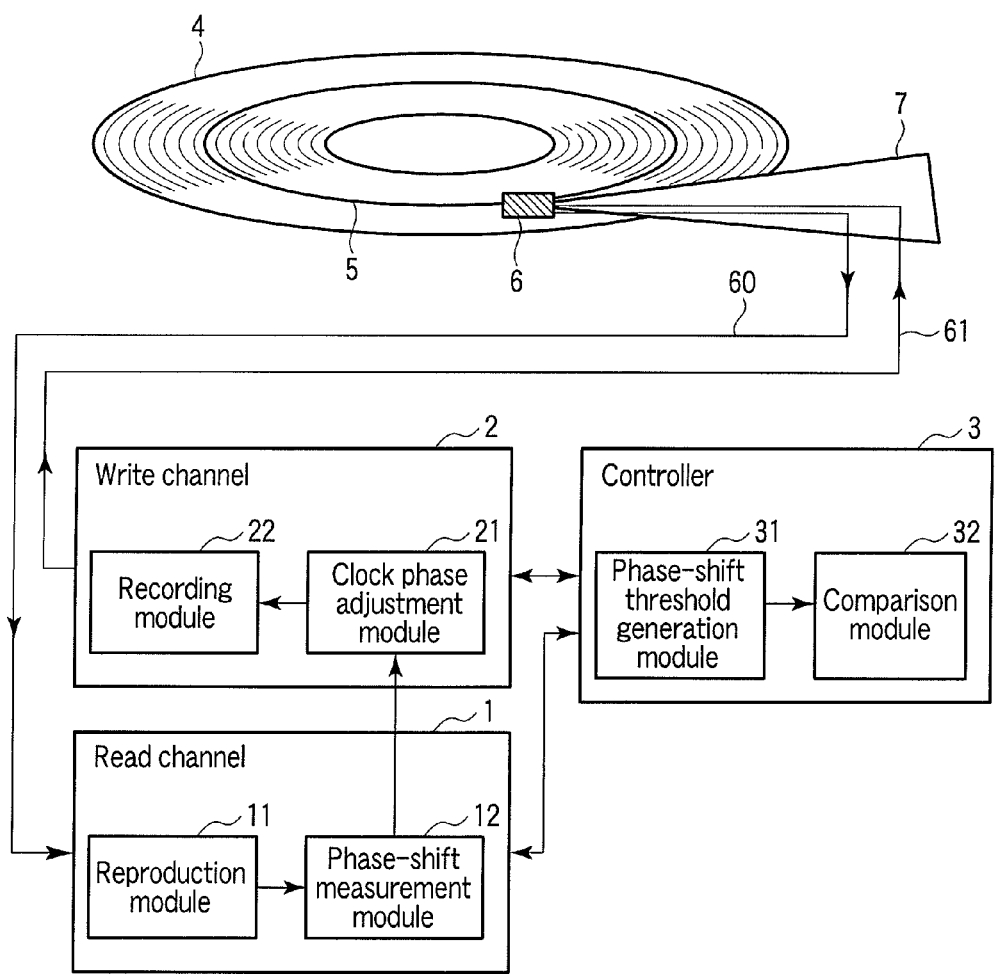
FIG. 1 is a diagram explaining the configuration of a disk drive according to an embodiment of this invention.

FIG. 1 is a diagram explaining the configuration of a disk drive according to an embodiment of the present invention. As shown in FIG. 1, the disk drive has a magnetic disk 4, a head 6, a read channel 1, a write channel 2, and a controller 3. The head 6 includes a read head and a write head. The read channel 1 reads reproduces data from a read signal 60 read by the read head from the magnetic disk 4. The write channel 2 outputs a write signal 61, which is supplied to the write head. The write head records the write signal 61 on the magnetic disk 4. In the disk drive, a head amplifier (not shown) is provided between the head 6, on the one hand, and the read channel 1 and write channel 2 on the other. The head amplifier amplifies the read signal 60 output from the read head, and converts the write signal 61 output from the write channel 2, to a write current that drives the write head. The head amplifier is not described herein, for the sake of convenience.

The controller 3 controls the read channel 1 and write channel 2, ultimately controlling the data recording and the data reproduction. The head 6 is mounted on an actuator 7 and can be moved in the radial direction of the magnetic disk 4 and positioned at a target position over the magnetic disk 4.

The magnetic disk 4 is a recording medium that is a bit-patterned medium (BPM). That is, magnetic dot groups that are physically isolated from one another are formed in each track 5 provided on the magnetic disk 4. The data recorded on the magnetic disk 4, in units of bits, corresponds to one magnetic dot or a plurality of magnetic dots. Phase-shift measuring bits and data recording bits are recorded in the track 5. Each of the phase-shift measuring bits and data recording bits corresponds to one magnetic dot or a plurality of magnetic dots. The phase-shift measuring bits are used to measure, from a reproduced signal, the phase shift that the write clock signal has with respect to the data recording bits.

Assume that the phase-shift measuring bit groups have been recorded by using a prescribed write clock signal in the present embodiment. Then, the phase-shift measuring bit groups may be recorded by using a write clock signal that has the highest frequency any write clock signal can have to record the data recording bits data. The data recording bits are used to record user data. The phase-shift measuring bit groups are formed in a data record area other than the data record area in which the bit groups for recording data are formed.

The read channel 1 has a reproduction module 11 and a phase-shift measurement module 12. The reproduction module 11 outputs a signal reproduced from the phase-shift measuring bits, including one or more magnetic dots formed in the track 5. The phase-shift measurement module 12 determines whether the reproduced signal is indefinite or not, and measures the phase shift the write clock signal has with respect to the data recording bits, on the basis of the result of this determining.

The fact that the reproduced signal is indefinite means a state in which it is impossible to determined to which magnetization direction the level of the reproduced signal corresponds, in the phase-shift measuring bits, which have been magnetized by the recording magnetic field based on the write clock. To be more specific, the phase-shift measurement module 12 first determines the bits for measuring phase shift corresponding to the reproduced signal determined to be indefinite. The phase-shift measurement module 12 then determines that the phase shift corresponding to the bits, thus determined, is the phase shift of the write clock signal, on the basis of the associated data stored in a phase-shift table 13. The phase-shift table 13 holds various phase-shift values the write clock signal may have with respect to the phase-shift measuring bits and data recording bits. Hence, the phase-shift table 13 serves to determine the phase shift of the write clock signal at high accuracy.

The write channel 2 has a clock phase adjustment module 21 and a recording module 22. The clock phase adjustment module 21 generates a write clock signal on the basis of the phase shift measured by the phase-shift measurement module 12. The write clock signal, so generated, will be used to record data in the data record area of the magnetic disk 4, in which the data recording bits are formed.

The clock phase adjustment module 21 adjusts the phase of the write clock signal, cancelling (or minimizing) the phase shift measured. The write clock signal is thereby synchronized with the data recording bits. The recording module 22 uses the write clock signal thus generated (or adjusted), and supplies a write current (write signal) to the write head of the head 6. The write head records the data corresponding to the data recording bits generated from the write current, in the data record area of the magnetic disk 4. Thus, synchronization can be achieved to record data that corresponds to the data recording bits.

The controller 3 has a phase-shift threshold generation module 31 and a comparison module 32. The phase-shift threshold generation module 31 outputs a prescribed threshold value, which will be compared with the phase shift measured by the phase-shift measurement module 12. The comparison module 32 compares the phase shift measured by the phase-shift measurement module 12 with the threshold value output by the phase-shift threshold generation module 31. In accordance with the difference acquired, the comparison module 32 controls the recording module 22 of the write channel 2. So controlled, the recording module 22 executes a data recording process.

FIG. 2 is a diagram showing an example of the phase-shift table 13. As shown in FIG. 2, the phase-shift table 13 may hold, for example, the order (n) in which the phase-shift measuring bits formed on the magnetic disk 4, including magnetic dots, are arranged, and the data presenting the relation between the order and the phase shift of the write clock signal.

Figure 3:
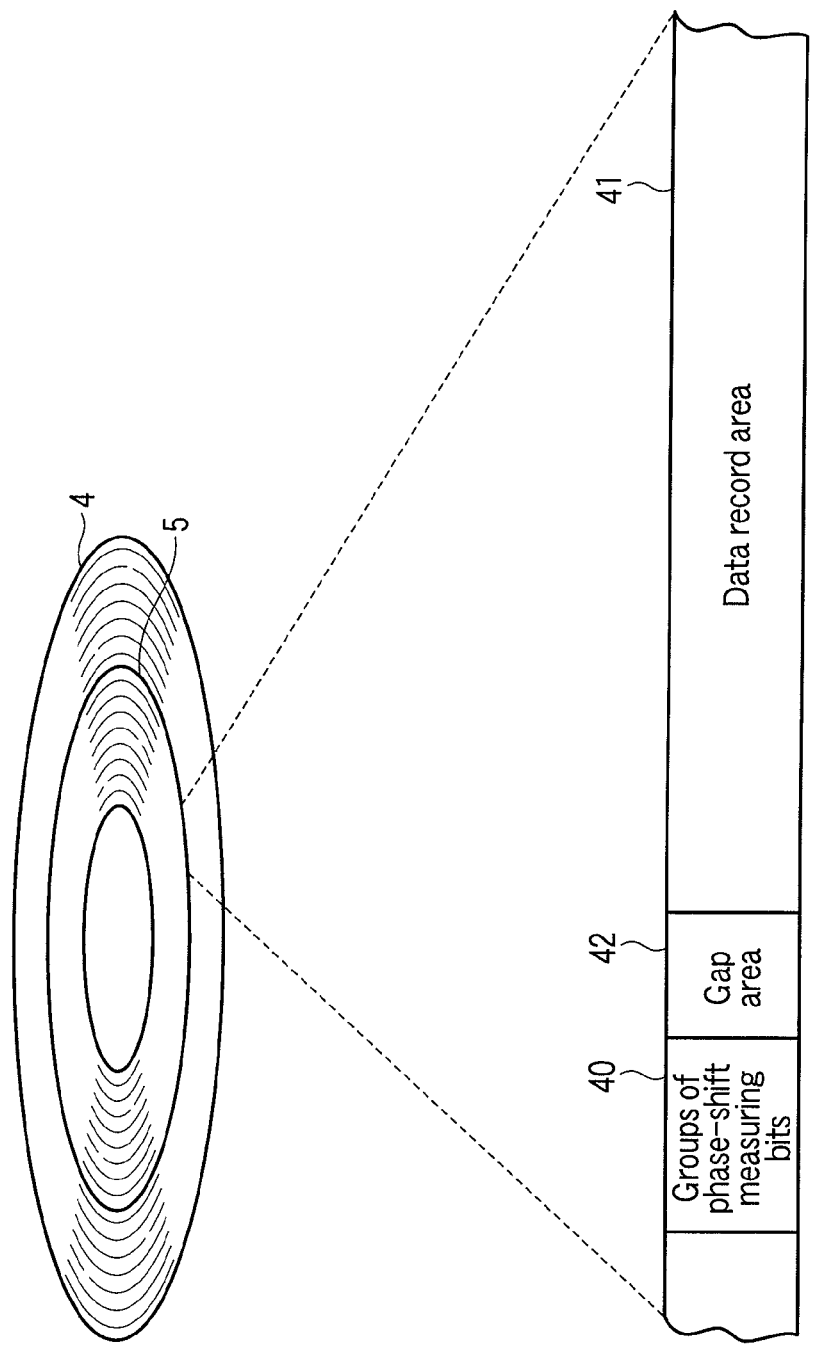
FIG. 3 is a diagram illustrating an exemplary track format according to the embodiment.

FIG. 3 is a diagram illustrating an exemplary format of each track formed on the magnetic disk 4. As shown in FIG. 3, an area 40, in which the bit groups for measuring phase shift are formed, is positioned before a data record area 41 in which bit groups for recording data are formed. More precisely, the area 40 is positioned before a gap area 42 that precedes the data record area 41. Each track is divided into a plurality of sectors. The head part of each sector is a preamble, as pointed out earlier. The phrase of "Positioned before a gap area 42" means an area following the preamble area of the sector. The gap area 42 has a length equivalent to the time needed to measure the phase shift and generate the write clock signal.

FIGS. 4A to 4E are diagrams illustrating various examples of phase-shift measuring bits. As seen from FIGS. 4A to 4E, any rectangle represents an area in which a bit for recording one data bit, and corresponds to a magnetic dot (black dot). That is, in the case of FIGS. 4A to 4C, one magnetic dot corresponds to one bit for recording one-bit data. In the case of FIGS. 4D and 4E, a plurality of magnetic dots (i.e., two dots) corresponds to one bit for recording one-bit data.

Moreover, as seen from FIG. 4A, the magnetic dots are rectangular. Alternatively, they may be circular as shown in FIGS. 4B and 4D. Still alternatively, they may be elliptic as shown in FIGS. 4C and 4E. Each bit for measuring phase shift corresponds to one or more magnetic dots, as the data recording bits, which are shown in FIGS. 4A to 4E.

(Method of Measuring the Phase Shift)

FIGS. 5A to 5C and FIG. 6 are diagrams explaining an exemplary process of finding phase-shift measuring bits that correspond to the reproduced signal. More precisely, FIG. 5A shows the waveform of a write current, FIG. 5B shows data recording bits 100, and FIG. 5C shows phase-shift measuring bits 101.

The waveform indicated by a block line in FIG. 5A is the waveform of a write current that has a zero-degree phase shift with respect to the data recording bits 100 shown in FIG. 5B, i.e., the distance from the midpoint between two adjacent data recording bits 100 to the transition point of the recording magnetic field. In this embodiment, each phase-shift measuring bit 101 is arranged at a predetermined distance from the cyclic reference position 200 of a data recording bit 100.

In FIGS. 5A to 5C and FIG. 6, "n" is the order in which the phase-shift measuring bits 101 (including the magnetic dots formed on the magnetic disk 4) are arranged. "p(n)" is the distance by which the nth phase-shift measuring bit 101 deviates from the cyclic reference position 200. "Pd" is the cycle of the data recording bits. "N0" is the divisor applied to $2\pi$ corresponding to the phase-shift measuring resolution $\Delta\omega$.

The phase-shift measuring bits 101 are arranged, satisfying the equation of $P(n)=Pdn/N0$. Note that the phase-shift measuring resolution $\Delta\omega$ is given as $2\pi/N0$.

Of each phase-shift measuring bit 101 shown in FIG. 5C, any hatched part has been magnetized. Each hatched pattern indicates the direction in which the part has been magnetized. Hence, different hatched patterns indicate different magnetization directions. Of each phase-shift measuring bit 101, that part where the hatched pattern changes is the position where the recording magnetic field is undergoing transition. The transition of the recording magnetic field may occur at the center of a phase-shift measuring bit 101. In this case, the signal reproduced from this phase-shift measuring bit 101 becomes indefinite.

In the disk drive according to this embodiment, a phase-shift measuring bit 101 is found, at which the recording magnetic field is undergoing transition at the center. (The signal reproduced from such a phase-shift measuring bit 101 is indefinite.) Then, the phase shift corresponding to the bit 101 found is measured, with reference to the phase-shift table 13.

As shown in, for example, FIG. 5C, of the phase-shift measuring bits 101 of the first column, the bit 101 at which the recording magnetic field is undergoing transition at the center, is a phase-shift measuring bit corresponding to n=3, encircled by a broken-line rectangle. That is, as shown in FIG. 6, the signal 600 reproduced from this phase-shift measuring bits 101 (n=3) is indefinite, because it cannot be determined which magnetization direction its level corresponds to.

The phase-shift measurement module 12 refers to, for example, the phase-shift table 13 of FIG. 2, determining zero degrees as the phase shift that corresponds to the phase-shift measuring bits 101 of n=3. As for the phase-shift measuring bits 101 of the second column shown in FIG. 5C, the phase-shift measurement module 12 determines that the signal reproduced from the phase-shift measuring bits 101 of n=4, encircled by a broken-line rectangle is indefinite. The phase-shift measurement module 12 then refers to the phase-shift table 13, determining 60 degrees as the phase shift that corresponds to the phase-shift measuring bits 101 of n=4. Similarly, as for the phase-shift measuring bits 101 of the third, fourth, fifth and sixth columns, the phase-shift measurement module 12 determines that the signals reproduced from the bit 101 of n=5, the bit of n=0, the bit of n=1, and the bit of n=2 are indefinite, as is illustrated in FIG. 5C. Finally, the phase-shift measurement module 12 determines that 120, 180, 240 and 300 degrees are phase shifts corresponding to these phase-shift measuring bits 101, respectively.

As has been described, the present embodiment can measure the phase shift of the write clock signal used to generate, at high precision, a write clock signal synchronous with the data recording bits that correspond to the magnetic dots formed on the magnetic disk 4.

[Other Embodiments]

FIG. 7 is a diagram showing an exemplary track format according to another embodiment of this invention. The disk drive according to this embodiment is identical in configuration to the disk drive shown in FIG. 1, and its components will not be described.

As shown in FIG. 7, on the magnetic disk 4, an area 40 in which the bit groups for measuring phase shift are formed is positioned after a data record area 41 in which bit groups for recording data are formed. More precisely, the area 40 is positioned after a gap area 42 that precedes the data record area 41. The gap area 42 has a length equivalent to the time needed to measure the phase shift and generate the write clock signal.

The phase-shift measurement module 12 determines whether the reproduced signal corresponding to a phase-shift measuring bit in an area positioned after the data record area 41 is indefinite or not. From the result of determining this, the phase-shift measurement module 12 measures the phase shift the write clock signal has with respect to the data recording bits. The comparison module 32 of the controller 3 compares the phase shift measured by the phase-shift measurement module 12 with the threshold value output by the phase-shift threshold generation module 31. If the phase shift measured is greater than the threshold value, the comparison module 32 controls the recording module 22 of the write channel 2. So controlled, the recording module 22 records the data in the data recording bits formed in the data record area 41.

In this embodiment, data can be recorded in the data record area 41, by using the phase shift measured from the reproduced signal corresponding to the phase-shift measuring bits arranged in the area that is positioned after the data record area 41 as shown in FIG. 7.

FIG. 8 is a diagram showing an exemplary track format according to still another embodiment of the present invention. This disk drive is identical in configuration to the disk drive shown in FIG. 1, and its components will not be described.

As shown in FIG. 8, on the magnetic disk 4, every two areas 40 in which the bit groups for measuring phase shift are formed are positioned before and after a data record area 41, respectively. More precisely, each area 40 is positioned before the gap area 42 that precedes the data record area 41, or after the gap area 42 that follows the data record area 41. The gap area 42 has a length equivalent to the time needed to measure the phase shift and generate the write clock signal.

The recording module 22 records data in the data recording bits formed in the data record area 41, by using the write clock signal generated on the basis of the phase shift measured from the signal reproduced from the phase-shift measuring bits that are in the area preceding the data record area 41. The phase-shift measurement module 12 of the read channel 1 measures the phase shift of the write clock signal, on the basis of the signal reproduced from the phase-shift measuring bits formed in the area following the data record area 41.

The comparison module 32 compares the phase shift measured on the basis of the signal reproduced from the phase-shift measuring bits formed in the area following the data record area 41, with the threshold value output by the phase-shift threshold generation module 31. If the phase shift measured is greater than the threshold value, the comparison module 32 controls the recording module 22 of the write channel 2. So controlled, the recording module 22 records the data in the data recording bits formed in the data record area 41.

In the embodiment described with reference to FIG. 8, data can be recorded again in the data record area 41, by using the phase shift measured from the reproduced signal corresponding to the phase-shift measuring bits arranged in the area that is positioned after the data record area 41.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
   a magnetic disk of the bit pattern media type, comprising a data record area including data recording bits and a measurement area including phase-shift measuring bits, wherein each phase-shift measuring bit is offset by an amount from a reference position, wherein an interval between a plurality of reference positions including said reference position is substantially equal to that between the data recording bits;
   a reproduction module configured to reproduce a signal from the measurement area on the magnetic disk configured to store groups of the phase-shift measuring bits; and
   a measurement module configured to measure a phase shift of a write clock signal with respect to the data recording bits, based on at least one of the phase-shift measuring bits corresponding to the reproduced signal that is determined to be instable because a magnetization direction corresponding to a level of the reproduced signal cannot be determined.

2. The disk drive of claim 1, wherein the measurement module is configured to determine whether the signal reproduced is instable, to search phase-shift measuring bits corresponding to the signal determined to be instable, and to determine the phase shift of the write clock signal on the basis of the phase-shift measuring bits found.

3. The disk drive of claim 1, further comprising a storage module configured to store data representing the relation between the phase-shift measuring bits and the phase shift of the write clock signal with respect to the data recording bits,
   wherein the measurement module is configured to search phase-shift measuring bits corresponding to the signal determined to be instable and to refer to the data in the storage module in order to determine the phase shift of the write clock signal with respect to the phase-shift measuring bits.

4. The disk drive of claim 1, wherein the measurement area is on the magnetic disk and located before the data record area.

5. The disk drive of claim 1, further comprising:
   a write clock signal generator configured to generate a write clock signal based on the phase shift measured by the measuring module, the write clock signal being adjusted to cancel or minimize the phase shift; and
   a recording module configured to record data corresponding to the data recording bits in the data record area with the write clock signal generated by the write clock signal generator.

6. The disk drive of claim 5, wherein the measurement area is on the magnetic disk and located after the data record area; and the measuring module is configured to search phase-shift measuring bits corresponding to the signal when the signal reproduced from the measurement area located after the data record area is instable and to measure the phase shift of the write clock signal with respect to the phase-shift measuring bits,
   the disk drive further comprising a controller configured to compare the measured phase shift with a predetermined threshold value, and to cause the recording module to record the data corresponding to the data recording bits in the data record area, when the measured phase shift is greater than the threshold value.

7. The disk drive of claim 6, wherein the measurement area is on both before and after the data record area, the recording module is configured to record data with the write clock signal adjusted to cancel or minimize the measured phase shift based on the signal reproduced from the measurement area located before the data record area, and the controller is configured to compare the measured phase shift with the threshold value and to cause the recording module to record the data one more time corresponding to the data recording bits, when the measured phase shift is greater than the threshold value.

8. The disk drive of claim 1, wherein each phase-shift measuring bit is in the measurement area, satisfying the following equation:

$p(n)=Pdn/NO$, where n is an order in which the phase-shift measuring bits are arranged, p(n) is the distance by which the nth phase-shift measuring bit deviates from a cyclic reference position of the data recording bits, Pd is the cycle of the data recording bits, and NO is the divisor applied to $2\pi$ corresponding to a phase-shift measuring resolution.

9. The disk drive of claim 1, wherein the magnetic dots dependent of each other are on the magnetic disk, and the data recording bits and the phase-shift measuring bits are recorded on the magnetic disk such that each phase-shift measuring bit corresponds to one or more magnetic dots.

10. A magnetic disk comprising:
    independent magnetic dots;
    a data record area comprising groups of data recording bits, each group corresponding to one or more magnetic dots; and
    a measurement area comprising groups of phase-shift measuring bits, each group corresponding to one or more magnetic dots and configured to measure the phase shift of a write clock signal with respect to the data recording bits, based on at least one of the phase-shift measuring bits corresponding to a reproduced signal that is determined to be instable because a magnetization direction corresponding to a level of the reproduced signal cannot be determined, wherein each phase-shift measuring bit is offset by an amount from a reference position, and wherein an interval between a plurality of reference positions including said reference position is substantially equal to that between the data recording bits.

* * * * *